United States Patent Office 2,759,116
Patented Aug. 14, 1956

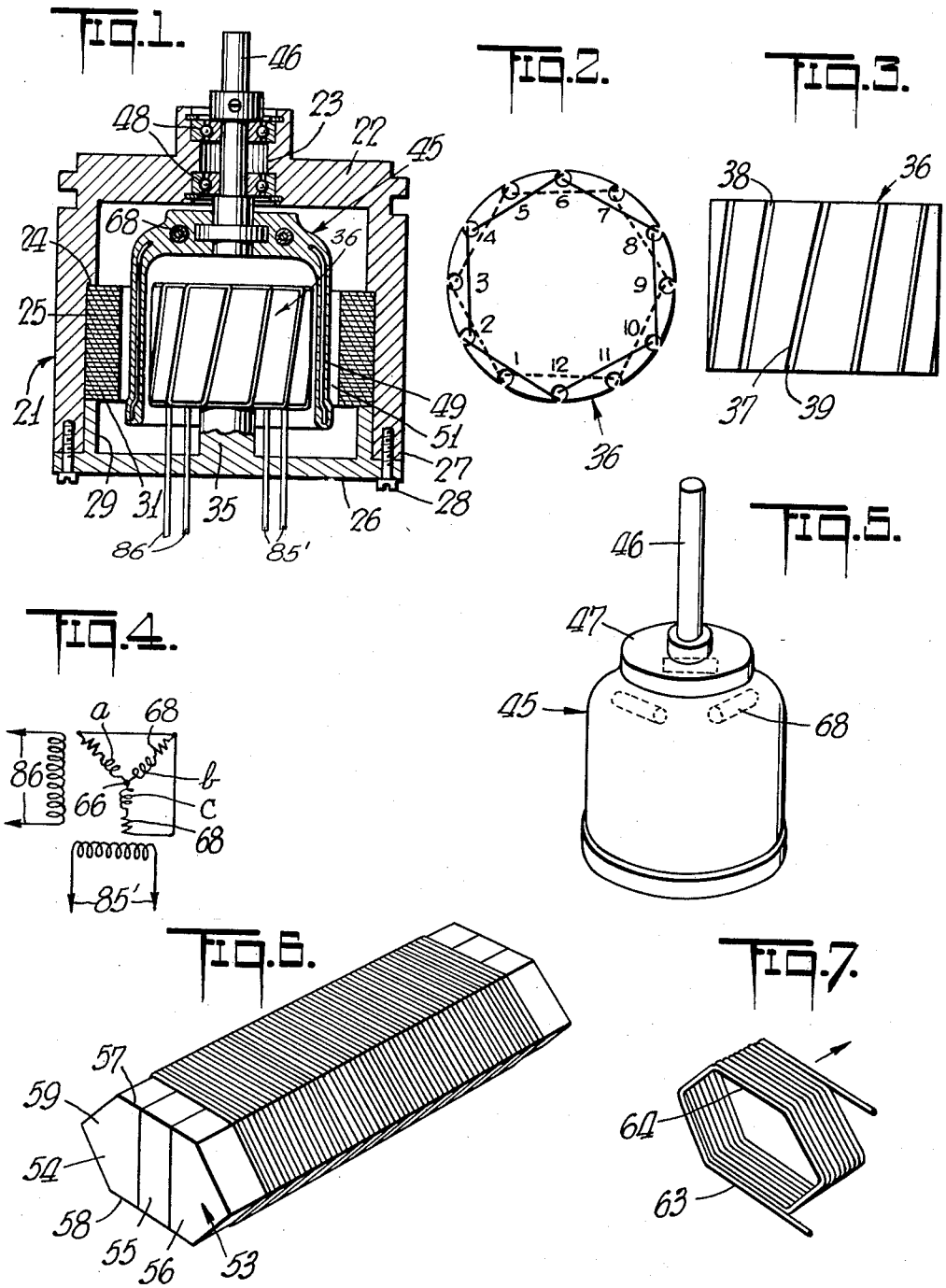

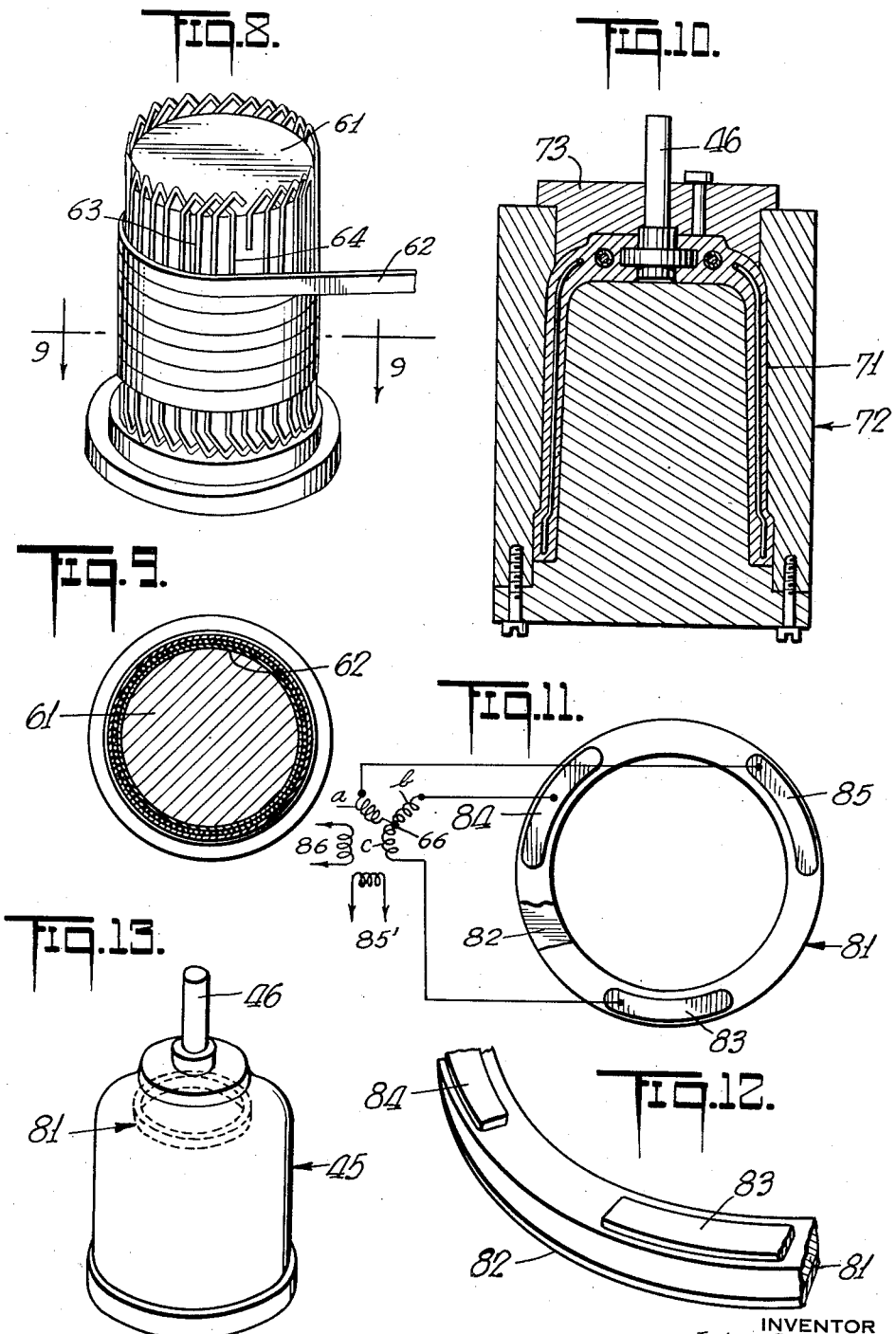

2,759,116
INDUCTION TYPE TACHOMETER

John P. Glass, Clifton Heights, Pa.

Application November 26, 1954, Serial No. 471,474

11 Claims. (Cl. 310—171)

This invention relates to the art of tachometers, more particularly of the type for giving an alternating current output whose magnitude varies with the rate of rotation of the unit under test and whose phase indicates the direction of shaft rotation.

In tachometers of the above type, the rotor is generally positioned in the air gap between a stator and a member provided to complete the path for the magnetic lines of flux.

Where the rotor is of copper, which has low resistivity for high sensitivity and is a squarrel cage or drag type cup, for example, the output of the unit varies with temperature changes at a given shaft speed.

Where the rotor is of manganium which is a metal of high resistivity having a low temperature coefficient, to achieve the desired sensitivity, the rotor must be large in size and hence requires a large air gap which causes relatively large power consumption with resultant low efficiency of the unit.

Where a tachometer generates odd harmonics, as the voltages caused by such harmonics will add and subtract from that caused by the fundamental excitation frequency and as the addition and subtraction depends upon the rate of rotation of the rotor of the unit under test, the output voltage of the tachometer will not be directly proportional to changes in its rate of rotation and hence will be nonlinear.

It is accordingly among the objects of the invention to provide a tachometer of the above type that is small, compact and durable with low power consumption and high sensitivity and which may readily be fabricated at relatively low cost and which will be substantially unaffected by temperature changes and which is designed to eliminate odd harmonics so as to provide an output voltage that is directly proportional to the rate of rotation of the rotor of the unit under test and hence is linear.

According to a preferred embodiment of the invention, the tachometer comprises a rotor and a stator element, one of said elements being connected in a three-phase arrangement with the outer ends of the Y arrangement being electrically connected so as to eliminate third harmonics and having the pitch of its windings such that the spacing between adjacent legs of each complete loop is approximately 51.4 mechanical degrees to eliminate seventh harmonics. The skew of the winding slots of the other of said elements is arranged so as to eliminate fifth harmonics.

Each of the windings of the three-phase arrangement has a temperature compensating resistor connected in series therewith and in the illustrative embodiment the rotor element carries the three-phase winding and is molded as an integral unit containing the resistors as well as the rotor winding.

In the accompanying drawings in which are shown one or more of various possible embodiments of the several features of the invention, Fig. 1 is a view partly in cross section of the tachometer unit, Fig. 2 is a top plan view of the stator element illustrating the positioning of the stator windings, Fig. 3 is a side elevational view of the stator illustrating the skew of the winding slots therein, Fig. 4 is a diagrammatic view of the electrical circuit of the tachometer, Fig. 5 is a perspective view of the rotor cup, Fig. 6 is a perspective view of the mandrel for forming the rotor windings, Fig. 7 is a perspective view illustrating one step in the formation of the rotor winding, Fig. 8 is a diagrammatic perspective view showing another step in the formation of the rotor winding, Fig. 9 is a transverse sectional view taken along line 9—9 of Fig. 8, Fig. 10 is a sectional view of the mold for forming the rotor cup, Fig. 11 is a top plan view of an alternative type of resistor element to be used with the rotor, Fig. 12 is a fragmentary perspective view of the resistor element of Fig. 11, and Fig. 13 is a perspective view of another embodiment of the rotor cup incorporating the resistor element of Figs. 11 and 12.

Referring now to the drawings, as shown in Fig. 1, the tachometer desirably comprises a cup-shaped casing 21 having an end wall 22 with an axial bore 23 therethrough.

Positioned in the casing 21 against an internal annular shoulder 24 is an annular member 25 formed from a plurality of laminations of suitable magnetic material. To retain the annular member 25 against the shoulder 24, a cover plate 26 is provided which is desirably affixed to the mouth 27 of the casing 21 as by screws 28 and which has an inwardly extending flange 29 which abuts against the end 31 of the annular member 25 to retain it in position.

Extending inwardly from the cover plate 26, is a hub 35 axially aligned with the bore 23 in end wall 22. The hub 35 supports a stator member 36, preferably in the form of a circular block composed of a stack of laminations also of magnetic material.

The stator 36 has a plurality of parallel slots 37 in its periphery, illustratively twelve in number distributed so that as shown in Figs. 2 and 3, the upper ends of the slots are spaced thirty degrees apart.

Assuming that a full slot skew, where the slot is inclined so that its upper end 38 is vertically aligned with the lower end 39 of the adjacent slot, is equal to ninety degrees (in a six pole device) and zero skew is where the slots are parallel to the axis of the stator, to eliminate the fifth harmonic from the tachometer unit, the slot skew is made one-fifth of 360 degrees or 72 degrees which is eighty per cent of the full slot skew and this eighty per cent skew is illustratively shown in Fig. 3 of the drawings in which the upper end 38 of a slot is circumferentially spaced from the lower end 39 of the next adjacent slot.

The stator 36 is wound with two windings at right angles to each other. Thus, as illustratively shown in Fig. 2, in a six pole winding, one set of the windings would extend between the notches 1—3, 3—5, 5—7, 7—9, 9—11 and 11—1 and the other set of windings would extend between the notches 2—4, 4—6, 6—8, 8—10, 10—12 and 12—2.

Coacting with the stator 36 and the annular member 25 is a rotor 45 which is constructed so as to eliminate the third and seventh harmonics from the tachometer. As shown in Figs. 1 and 5, the rotor is a substantially cup-shaped member having an axial shaft 46 extending from its end wall 47 and said shaft is journalled in suitable bearings 48 in the bore 23 of the end wall 22 of the casing 21. The rotor is conformed so that the stator 36 will fit therein and the side wall 49 of the rotor will be positioned in the air gap 51 between the annular member 25 and the stator 36.

Although the rotor 45 may be formed in any suitable manner, as illustratively shown herein, a winding mandrel 53 (Fig. 6) is provided which may comprise three elongated strips 54, 55 and 56. The strips 54 and 56 which are identical are pentagonal in cross section, each having parallel walls 57 and 58 and being triangular at its outer end as at 59. The strip 55 is rectangular in cross section so that when the three strips 54, 55 and 56 are in juxtaposition, as shown, they will provide a mandrel that in cross section has triangular ends and parallel sides.

The strips 54, 55 and 56 on their outer surface are provided with suitable grooves which, when the strips are in juxtaposition to form the winding mandrel, will form a helix. Thus, when a continuous length of wire is wound around the mandrel, it will also form a helix. To remove the helix thus formed from the mandrel, it is merely necessary first to withdraw the central strip 55 and thereupon to move the strips 54 and 56 toward each other for ready removal from the helix. The helix thus formed, which is shown in Fig. 7, is then flattened to form substantially a ribbon, so that the runs of wire thereof will lie in substantially the same plane.

A circular mandrel 61 (Fig. 8) is prepared with windings of tape 62 of insulating material wound therearound, such tape for example being of fibre glass. To eliminate the third harmonic, the rotor windings are connected in a three-phase arrangement. Thus, three sections $a$, $b$ and $c$ (Fig. 4), of the helix are selected of sufficient length so that when wrapped around the mandrel 61 as diagrammatically shown in Fig. 8, with the parallel runs 63, 64 of each complete turn or loop of wire parallel to the axis of the mandrel, each section will occupy 120 degrees of circumference of the mandrel 61.

To eliminate the seventh harmonic from the tachometer, the dimensions of the mandrel 53 are selected so that the parallel runs 63 and 64 of each complete turn or loop of wire wound around the mandrel 53 will be equal to 360 degrees divided by 7 (the seventh harmonic) or 51.42 degrees apart when wound around the mandrel 61 shown in Fig. 8.

As shown in Fig. 4, one end of each of the three sections above described, is connected to a common terminal 66 and the other end of each of the sections is connected respectively to one end of an associated temperature compensating resistor 68, the other ends of said resistors being connected together. The resistors 68 have a negative temperature coefficient of resistivity, i. e., their resistance increases with decrease in temperature and such resistors may be of the type sold by the Keystone Carbon Company of St. Mary's, Pennsylvania.

After the three sections of wire are wrapped around the tape wound around the mandrel 61 they are covered with a second winding of tape. The Y connected unit thus formed, together with the resistors connected thereto, is removed from the mandrel and is positioned in the cavity 71 of a suitable mold 72, the resistors being positioned near the upper end of the cavity in said mold as is the end of shaft 46 which extends through the top wall 73 of the mold. The mold is charged with a suitable thermo-setting resin such as a polyester or epoxy type resin and the resin is treated in conventional manner to form the finished rotor cup.

In the embodiment shown in Figs. 11, 12 and 13, the individual resistors are replaced by an annular member 81 of resistive material which has a conductive coating 82 on one surface and a plurality of conductive coatings 83, 84 and 85 on the opposed surface. Thus, the portions of the resistive member 81 between the coating 82 and the coatings 83, 84 and 85 form three resistive elements, each of which may be connected in series with the three windings $a$, $b$ and $c$ of the rotor as previously described. The annular resistor member 81 is readily positioned in the cavity in the mold and molded into the rotor in the manner previously described.

With the constructions above described, the tachometer will function with substantially the complete elimination of the third, fifth, seventh odd harmonics and be independent of temperature variations. As a result, when the terminals 85' of the stator winding are energized with a reference voltage of say 400 cycles per second and the rotor 45 is turned by some driving unit, the voltage output from the stator winding 36 will be directly proportional to the rate of rotation of the rotor 45 and the phase of such output voltage will depend upon the direction of rotation of said rotor.

The tachometer has many applications and, for example, may be used in conjunction with computers or can give a direct indication of rate and direction of rotation on a phase sensitive volt meter of the center scale type.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A tachometer comprising a fixed member of magnetic material, a rotatable member, one of said members having a pair of windings at right angles to each other, one of said windings being an input winding and the other an output winding, said windings being inclined so as to eliminate fifth harmonics, the other of said members having three sets of windings connected in a three-phase arrangement to eliminate third harmonics and having the spacing between the wires of successive loops arranged to eliminate seventh harmonics, whereby when said rotatable member is turned, it will cut the lines of flux developed by said input winding when the latter is energized to provide a voltage across the output winding that is directly proportional to the rate of rotation of said rotatable member.

2. The combination set forth in claim 1 in which the fixed member carries the pair of windings and an additional fixed member of magnetic material is provided defining an air gap with respect to the first fixed member and said rotatable member is positioned in said air gap.

3. The combination set forth in claim 1 in which the rotatable member is substantially cup-shaped and the fixed member is positioned in said rotatable member.

4. The combination set forth in claim 1 in which the rotatable member is substantially cup-shaped, the fixed member is positioned in said rotatable member and carries the pair of windings and an additional fixed member of magnetic material encompasses said cup-shaped member and defines an air gap with respect to said first fixed member.

5. The combination set forth in claim 1 in which each of the three sets of windings occupies substantially 120 degrees of arc.

6. The combination set forth in claim 1 in which each of the three sets of windings occupies substantially 120 degrees of arc, one of the ends of each set of windings being connected to a common junction and the other end of each set of windings being connected to one end of a temperature compensating resistor, the other ends of said resistors being connected together.

7. The combination set forth in claim 1 in which each of the three sets of windings occupies substantially 120 degrees of arc, the windings forming loops, each loop having a pair of substantially parallel legs, the legs of each loop being spaced by approximately 51.4 degrees of arc.

8. The combination set forth in claim 1 in which the inclined windings are parallel to each other, the upper end of one winding being circumferentially spaced from the lower end of the next adjacent winding.

9. A tachometer comprising a substantially cup-shaped rotor member, a substantially cylindrical stator member of magnetic material, positioned in said rotor, an annular member of magnetic material encompassing said rotor and defining an annular air gap with respect to said stator in which the side wall of said rotor is positioned, said stator having a pair of windings at right angles to each other, one of said windings being an input winding and the other an output winding, said windings being parallel to each other extending the length of said stator and being inclined so that the upper end of one winding is circumferentially spaced from the lower end of the next adjacent winding to eliminate fifth harmonics, said rotor having three temperature compensating resistors and having three sets of windings each occupying substantially 120 degrees of arc, one of the ends of each set of windings being connected to a common junction and the other end of each set of winding being connected to one end of one of said resistors, the other end of said resistors being connected together, said rotor winding arrangement eliminating third harmonics, said three sets of winding forming loops, each loop having a pair of substantially parallel legs, the legs of each loop being spaced by approximately 51.4 degrees of arc to eliminate seventh harmonics whereby, when the rotor is turned, it will cut the lines of flux developed by said input winding when the latter is energized to provide a voltage across the output winding that is directly proportional to the rate of rotation of said rotor.

10. The combination set forth in claim 9 in which the rotor is a molded unit containing the three sets of windings in the side wall and the resistors in the end wall thereof.

11. The combination set forth in claim 10 in which the resistors comprise an annulus of resistive material having a common conductive coating on one side and three conductive coatings on the other side, the regions between each of the three conductive coatings and the common conductive coating defining the resistors.

References Cited in the file of this patent

UNITED STATES PATENTS

| | | |
|---|---|---|
| 2,206,920 | Riggs | July 9, 1940 |

FOREIGN PATENTS

| | | |
|---|---|---|
| 673,793 | Great Britain | June 11, 1952 |
| 843,441 | Germany | July 7, 1952 |